(12) United States Patent
Yilmaz

(10) Patent No.: US 9,086,770 B2
(45) Date of Patent: Jul. 21, 2015

(54) TOUCH SENSOR WITH HIGH-DENSITY MACRO-FEATURE DESIGN

(71) Applicant: Esat Yilmaz, Santa Cruz, CA (US)

(72) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/863,036

(22) Filed: Apr. 15, 2013

(65) Prior Publication Data

US 2014/0306922 A1  Oct. 16, 2014

(51) Int. Cl.
   *G06F 3/044* (2006.01)

(52) U.S. Cl.
   CPC ...... *G06F 3/044* (2013.01); *G06F 2203/04112* (2013.01)

(58) Field of Classification Search
   CPC ................. G06F 3/044; G06F 2203/04106
   USPC ............... 345/156–184; 178/18.01–20.01
   See application file for complete search history.

(56) References Cited

U.S. PATENT DOCUMENTS

| | | | |
|---|---|---|---|
| 5,861,875 A * | 1/1999 | Gerpheide | 345/174 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,599,161 B2 * | 12/2013 | Philipp | 345/173 |
| 8,723,824 B2 | 5/2014 | Myers | |
| 8,786,572 B2 * | 7/2014 | Yilmaz | 345/174 |
| 2006/0097991 A1 * | 5/2006 | Hotelling et al. | 345/173 |
| 2008/0309635 A1 | 12/2008 | Matsuo | |
| 2009/0315854 A1 | 12/2009 | Matsuo | |
| 2010/0044122 A1 * | 2/2010 | Sleeman et al. | 178/18.06 |
| 2010/0045632 A1 * | 2/2010 | Yilmaz et al. | 345/174 |
| 2010/0123670 A1 * | 5/2010 | Philipp | 345/173 |
| 2010/0302201 A1 * | 12/2010 | Ritter et al. | 345/174 |
| 2011/0095990 A1 * | 4/2011 | Philipp et al. | 345/173 |
| 2011/0102370 A1 * | 5/2011 | Kono et al. | 345/174 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Patrick F Marinelli
(74) *Attorney, Agent, or Firm* — Baker Botts LLP

(57) ABSTRACT

In one embodiment, a touch position-sensing panel comprises a sensing area comprising a substrate, a plurality of first electrodes in a first layer, the plurality of first electrodes comprising conductive mesh and arranged in a first direction, the first layer having a first plurality of gaps formed therein, a plurality of second electrodes in a second layer, the plurality of second electrodes comprising conductive mesh and arranged in a second direction, the second layer having a second plurality of gaps formed therein, wherein the plurality of first electrodes and the plurality of second electrodes overlap to create a plurality of nodes, and wherein each of the plurality of gaps runs in a generally straight line from one side of the sensing area to an opposing side of the sensing area.

15 Claims, 6 Drawing Sheets

(56) References Cited

U.S. PATENT DOCUMENTS

| | | |
|---|---|---|
| 2012/0139864 A1* | 6/2012 | Sleeman et al. .............. 345/174 |
| 2012/0242585 A1* | 9/2012 | Jones et al. .................. 345/173 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0261242 A1* | 10/2012 | Guard et al. ................. 200/600 |
| 2012/0262382 A1* | 10/2012 | Guard et al. ................. 345/173 |
| 2012/0262412 A1* | 10/2012 | Guard et al. ................. 345/174 |
| 2013/0001059 A1* | 1/2013 | Wu et al. ...................... 200/600 |
| 2013/0076612 A1 | 3/2013 | Myers |
| 2013/0113502 A1* | 5/2013 | Yilmaz et al. ................ 324/649 |
| 2013/0120314 A1* | 5/2013 | Ishibashi et al. ............. 345/174 |
| 2013/0127771 A1* | 5/2013 | Carley et al. ................. 345/174 |
| 2013/0127775 A1* | 5/2013 | Yilmaz et al. ................ 345/174 |
| 2013/0153391 A1* | 6/2013 | Liu et al. ...................... 200/600 |
| 2013/0154991 A1* | 6/2013 | Yilmaz ......................... 345/174 |
| 2013/0155001 A1* | 6/2013 | Yilmaz et al. ................ 345/174 |
| 2013/0176070 A1* | 7/2013 | Guard .......................... 327/517 |
| 2013/0180841 A1* | 7/2013 | Yilmaz et al. ................ 200/600 |
| 2013/0181910 A1* | 7/2013 | Yilmaz et al. ................ 345/173 |
| 2013/0181911 A1* | 7/2013 | Yilmaz et al. ................ 345/173 |
| 2013/0241875 A1* | 9/2013 | Wu et al. ...................... 345/174 |
| 2013/0293096 A1* | 11/2013 | Kang et al. ................... 313/511 |
| 2014/0049485 A1* | 2/2014 | Oh et al. ....................... 345/173 |
| 2014/0292703 A1* | 10/2014 | Yilmaz, Esat ................ 345/174 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

\* cited by examiner

TOUCH SENSOR WITH HIGH-DENSITY MACRO-FEATURE DESIGN

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
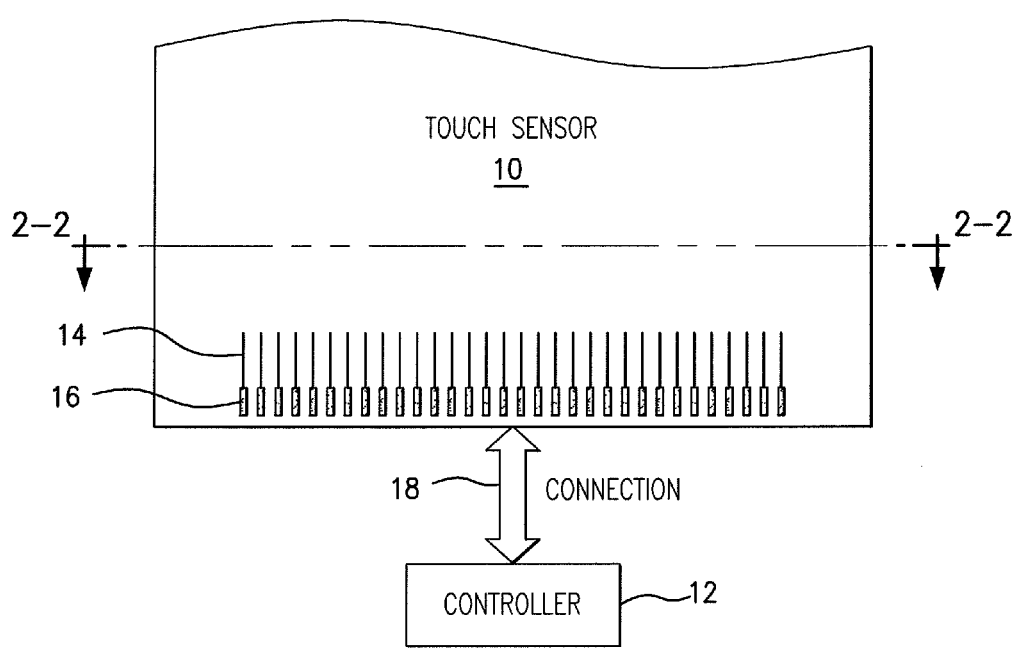
FIG. 1 illustrates a touch sensor and touch sensor controller in accordance with particular embodiments.

FIG. 1 illustrates a touch sensor and touch sensor controller in accordance with particular embodiments. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the controller and its touch sensor, where appropriate. Touch sensor 10 may include one or more touch-sensitive areas, or sensing areas, where appropriate. Touch sensor 10 may include an array of drive and sense electrodes (electrodes 102 and 103 in FIGS. 2 through 6A, 6B, and 6C) or an array of electrodes of a single type disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, quadrilateral, other suitable shape, or suitable combination of these shapes. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% (such as for example, approximately 5%) of the area of its shape. As an example and not by way of limitation, an electrode may be made of fine lines of metal or other conductive material (such as for example copper, silver, or a copper- or silver-based material) and the fine lines of conductive material may occupy substantially less than 100% (such as for example, approximately 5%) of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more macro-features of a touch sensor may determine one or more characteristics of its functionality. One or more characteristics of the implementation of those shapes (such as, for example, the conductive materials, fills, or patterns within the shapes) may constitute in whole or in part one or more micro-features of the touch sensor. One or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of optically clear adhesive may be disposed between the cover panel and the substrate with the conductive material forming the drive or sense electrodes. The mechanical stack may also include a second layer of optically clear adhesive and a dielectric layer (which may be made of PET or another suitable material, similar to the substrate with the conductive material forming the drive or sense electrodes). As an alternative, where appropriate, a thin coating of a dielectric material may be applied instead of the second layer of optically clear adhesive and the dielectric layer. The second layer of optically clear adhesive may be disposed between the substrate with the conductive material making up the drive or sense electrodes and the dielectric layer, and the dielectric layer may be disposed between the second layer of optically clear adhesive and an air gap to a display of a device including touch sensor 10 and touch-sensor controller 12. As an example only and not by way of limitation, the cover panel may have a thickness of approximately 1 mm; the first layer of optically clear adhesive may have a thickness of approximately 0.05 mm; the substrate with the conductive material forming the drive or sense electrodes may have a thickness of approximately 0.05 mm; the second layer of optically clear adhesive may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of optically clear adhesive, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitatively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitatively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitatively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs)—such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. In particular embodiments, multiple touch-sensor controllers 12 are disposed on the FPC. In some embodiments, the FPC may have no touch-sensor controllers 12 disposed on it. The FPC may couple touch sensor 10 to a touch-sensor controller 12 located elsewhere, such as for example, on a printed circuit board of the device. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

In particular embodiments, touch sensor 10 may have a multi-layer configuration, with drive electrodes disposed in a pattern on one side of a substrate and sense electrodes disposed in a pattern on another side of the substrate. In such a configuration, a pair of drive and sense electrodes capacitively couple to each other at the intersection of a drive electrode and sense electrode. In particular embodiments, a multi-layer configuration of drive and sense electrodes may satisfy certain space and/or shape constraints with respect to the construction of touch sensor 10. Particular embodiments and examples of multi-layer configurations of drive and sense electrodes will be discussed further with respect to FIGS. 2 through 6A, 6B, and 6C.

Figure 2:
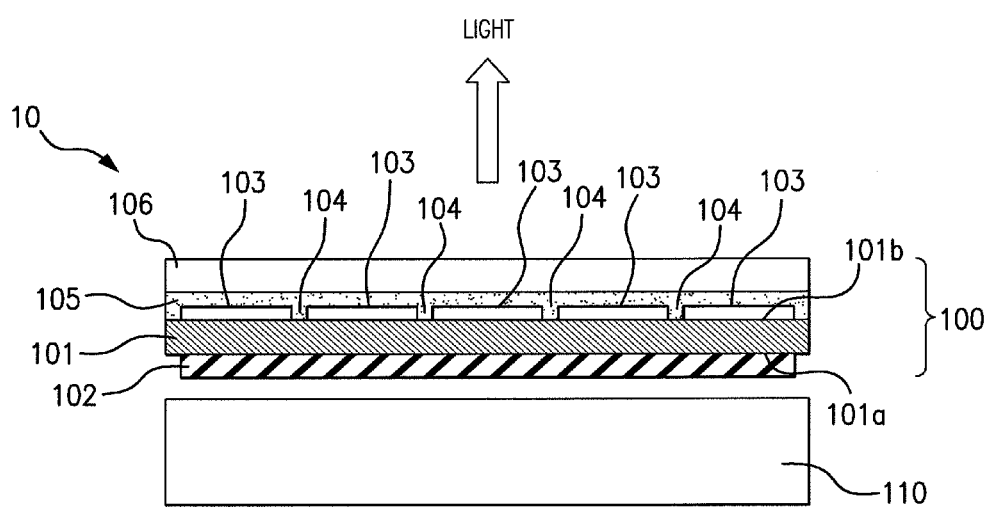
FIG. 2 illustrates a cross section of a touch sensor along the line 2-2 in accordance with particular embodiments.

FIG. 2 illustrates a cross section of touch sensor 10 along line 2-2 illustrated in FIG. 1 in accordance with particular embodiments. Touch sensor 10 comprises a mechanical stack 100 and a display 110. Mechanical stack 100, which overlays display 110, includes a substrate 101, a drive electrode 102, a plurality of sense electrodes 103, a plurality of gaps 104, an optically clear adhesive 105, and a cover panel 106.

Substrate 101 has a plurality of surfaces, including a first surface 101*a* facing display 110 and a second surface 101*b* facing cover panel 106. Substrate 101 may be formed from a transparent, non-conductive material such as glass or a plastic as discussed in conjunction with FIG. 1. Drive electrode 102 is located on first surface 101*a* of substrate 101, such that drive electrode 102 is located between substrate 101 and display 110. In various embodiments, there may be an air gap between drive electrode 102 and display 110. This cross sectional view provides a view of the length of one drive electrode, drive electrode 102. In a particular embodiment, a plurality of drive electrodes 102 may be located between substrate 101 and display 110, with lengths running generally parallel to drive electrode 102. Drive electrodes may be formed from any suitable material, including, for example, conductive mesh as discussed in conjunction with FIG. 1. Each of a plurality of drive electrodes 102 may be separated from one or more adjacent drive electrodes by a cut in the conductive material, or a gap. A gap between adjacent drive electrodes is a cut in the lines of conductive material, such as copper, and may be as narrow as possible to enhance the electrode's shield ability against noise arising from the underlying display. In some embodiments, a gap between drive electrodes may have a width of approximately 100 μm to 5 μm, and in particular embodiments the width may be about 10 μm.

Sense electrodes 103 are located on second surface 101*b* of substrate 101, such that sense electrodes 103 are located between substrate 101 and cover panel 106. Sense electrodes may be formed from any suitable material, including, for example, conductive mesh as discussed in conjunction with FIG. 1. Each sense electrode 103 is separated from adjacent sense electrodes 103 by gaps 104. Gaps 104 are cuts in the lines of conductive material, such as copper, and may be as narrow as possible. In various embodiments, gaps 104 may have a width of approximately 100 μm to 5 μm, and in particular embodiments the width may be about 10 μm. This cross sectional view provides a view of the widths of sense electrodes 103. In certain embodiments, the widths of a touch sensor's sense electrodes may be shorter or longer than sense electrodes 103 as illustrated. In various embodiments, the widths of sense electrodes may be generally the same for all sense electrodes or may vary for each sense electrode 103. Further, in various embodiments, there may be a greater or fewer number of sense electrodes that illustrated herein. Capacitive nodes may be formed by capacitive coupling between overlapping sections of sense electrodes 103 and drive electrode 102.

Cover panel 106 is attached to sense electrodes 103 with optically clear adhesive 105. Cover panel 106 may be clear and made of a resilient material as discussed in conjunction with FIG. 1. As illustrated, light generated by display 110 passes through mechanical stack 100 and is visible to a user of touch sensor 10 through cover panel 106.

In certain embodiments, there may be additional components not illustrated herein. For example, adhesive may used between various layers within mechanical stack 100 or between mechanical stack 100 and display 110. Certain embodiments may include a second substrate and, in certain circumstances, sense electrodes may be attached to the first substrate and drive electrodes may be attached to the second substrate.

Figure 3A:
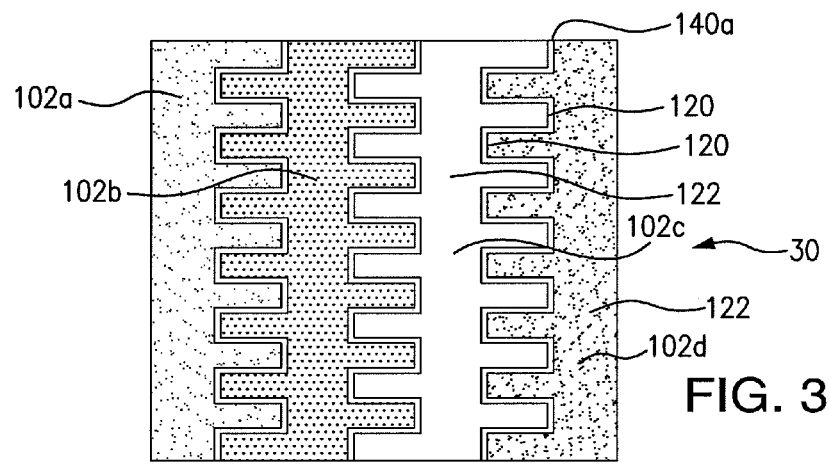
FIGS. 3A, 3B, and 3C illustrate an arrangement of sense and drive electrodes in accordance with a conventional approach.
Figure 3B:
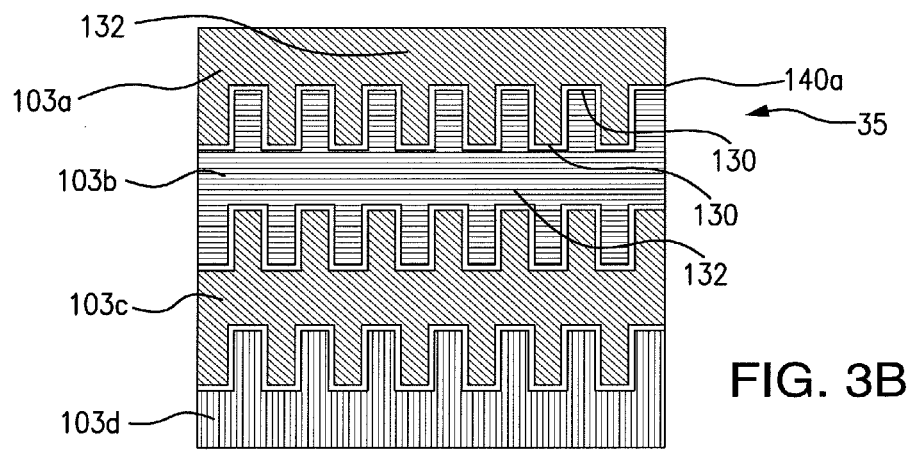
Figure 3C:
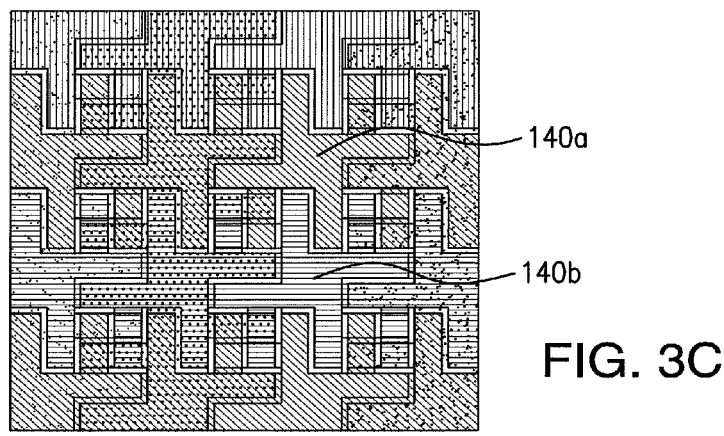

FIGS. 3A, 3B, and 3C illustrate an arrangement of sense and drive electrodes in accordance with a conventional approach. FIG. 3A illustrates a section of a drive electrode layer 30 with a particular pattern of drive electrodes that could be used in touch sensor 10. In FIG. 3A, two adjacent drive electrodes 102b and 102c are shown, together with parts of drive electrodes 102a and 102d.

Each drive electrode 102a, 102b, 102c, and 102d includes a plurality of digits 120. Each digit 120 has a particular length and width. In particular embodiments, each digit 120 is of substantially identical length and width. Each digit 120 extends from a base portion 122 of a drive electrode and is separated from a neighboring digit 120 by a space, a part of which is occupied by a digit of an adjacent drive electrode causing a drive electrode 102 to be interdigitated with adjacent drive electrodes.

In particular embodiments, drive electrodes 102a, 102b, 102c, and 102d are formed from conductive mesh. Cuts, or channels, in the lines of conductive material or conductive mesh create gaps 104a between adjacent drive electrodes. Gaps 104a electrically isolate a drive electrode from adjacent drive electrodes. Cuts in the conductive mesh may form drive electrodes of any suitable configuration, including electrodes of any suitable shape.

FIG. 3B illustrates a section of a sense electrode layer 35 with a particular pattern of sense electrodes that could be used in touch sensor 10. In FIG. 3B, two adjacent sense electrodes 103b and 103c are shown, together with parts of sense electrode 103a and 103d. Each sense electrode 103a, 103b, 103c, and 103d includes a plurality of digits 130. Each digit 130 has a particular length and width. In particular embodiments, each digit 130 is of substantially identical length and width. Each digit 130 extends from a base portion 132 of a sense electrode and is separated from a neighboring digit 130 by a space, a part of which is occupied by a digit of an adjacent sense electrode causing a sense electrode to be interdigitated with adjacent sense electrodes.

In particular embodiments, sense electrodes 103a, 103b, 103c, and 103d are formed from conductive mesh. Cuts, or channels, in the lines of conductive material or conductive mesh create gaps 104a between adjacent sense electrodes. Gaps 104a electrically isolate a sense electrode from adjacent sense electrodes. Cuts in the conductive mesh may form sense electrodes of any suitable configuration, including electrodes of any suitable shape.

FIG. 3C illustrates a pattern created by overlaying the interdigitated drive electrodes 102 with the interdigitated sense electrodes, which creates one or more capacitive nodes, for example, capacitive nodes 140a and 140b. Drive electrodes, as illustrated in FIG. 3A, generally run in one direction and are coupled to surface 101a of substrate 101 described in conjunction with FIGS. 1 and 2. Sense electrodes, as illustrated in FIG. 3B, generally run in a direction orthogonal to the drive electrodes and are coupled to side 101b of substrate 101 as described in conjunction with FIGS. 1 and 2. Thus, although drive electrodes and sense electrodes do not make electrical contact, they are able to capacitatively couple to form capacitive nodes at the points where a drive electrode intersects or overlays a sense electrode. In particular embodiments, drive electrodes and sense electrodes may be configured to create any suitable number of nodes and nodes with any suitable area. The interdigitated patterns of drive electrode layer 30 and sense electrode layer 35 may provide physical interpolation to the node capacitive fields and therefore may improve accuracy of the reported touch coordinate.

Although this approach may improve accuracy of the reported touch coordinate, the interdigitated pattern may make it difficult to employ in touch sensors with certain space or shape requirements that may prevent or limit the very precise cuts required in the conductive mesh. In embodiments employing a conductive mesh with a node pitch of a certain dimension, it may be difficult or impossible to use an interdigitated design. For example, if the node pitch of an electrode is 4 mm, the node pitch of the base portion or spine of the electrode may be 2 mm and the node pitch of the digits extending from the base portion may be 1 mm. These electrode configurations may produce limited or no redundancy and/or may result in a touch sensor with limited or no functionality, both of which are undesirable results. To address these challenges, the teachings of the disclosure recognize that it is possible to use generally quadrilateral electrodes without one or more digits in an orthogonal pattern. Using generally quadrilateral electrodes may allow for improved performance of the touch sensor, for example, through improved redundancy, and may allow for the use of electrode configurations in touch screen configurations with space constraints otherwise difficult to satisfy. FIGS. 4A, 4B, and 4C through 6A, 6B, and 6C illustrate this new approach.

Figure 4A:
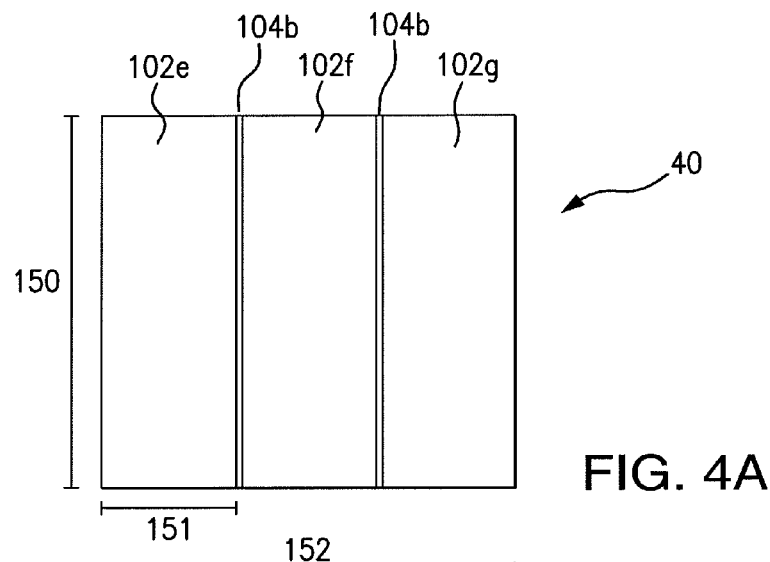
FIGS. 4A, 4B, and 4C illustrate another arrangement of sense and drive electrodes in accordance with particular embodiments of the disclosure.
Figure 4B:
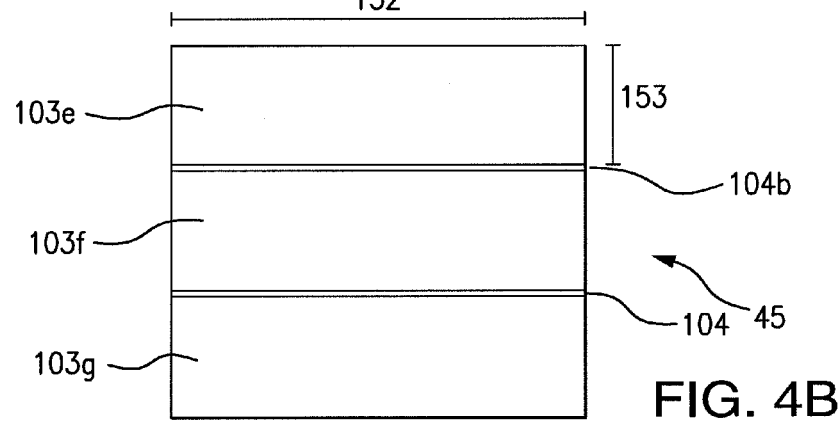
Figure 4C:
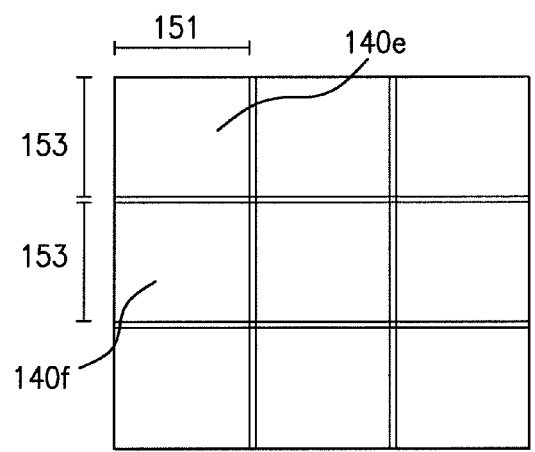

FIGS. 4A, 4B, and 4C illustrate another arrangement of drive electrodes 102 and sense electrodes 103 in accordance with particular embodiments of the disclosure. FIG. 4A illustrates a section of a drive electrode layer 40 with a particular pattern of drive electrodes 102 that could be used in touch sensor 10. Drive electrodes 102e, 102f, and 102g are formed from conductive mesh and are separated from each other by a plurality of gaps 104b. Gaps 104b are cuts in the lines of conductive mesh, which may be a copper conductive mesh in particular embodiments, and may be as narrow as possible. For example, gaps 104b may have a width of approximately 100 μm to 5 μm, and in particular embodiments the width may be about 10 μm. Drive electrode 102e extends generally from one edge of touch sensor 10 to another, along a length 150, with a width 151. In this embodiment, drive electrodes 102e, 102f, and 102g each have approximately the same length and approximately the same width. In various embodiments, the length and wide of drive electrodes may vary and may depend on the size and shape of the touch sensor. Drive electrodes 102e, 102f, and 102g do not include any digits like the digits illustrated and described in conjunction with FIG. 3, and are generally quadrilateral in shape, and in particular, are generally rectangular.

FIG. 4B illustrates a section of a sense electrode layer 45 with a particular pattern of sense electrodes 103 that could be used in touch sensor 10. Sense electrodes 103e, 103f, and 103g are formed from conductive mesh and are separated by a plurality of gaps 104b. Gaps 104b are cuts in the lines of conductive mesh, which may be a copper conductive mesh in particular embodiments, and may be as narrow as possible. For example, gaps 104b may have a width of approximately 100 µm to 5 µm, and in particular embodiments the width may be about 10 µm. Sense electrode 103e extends generally from one edge of touch sensor 10 to another, along a length 152, with a width 153. In this embodiment, sense electrodes 103e, 103f, and 103g each have approximately the same length and approximately the same width. In various embodiments, the length and wide of sense electrodes may vary and may depend on the size and shape of the touch sensor. Further, in certain embodiments, drive electrodes 102 and sense electrodes 103 may have approximately the same lengths and/or widths. Sense electrodes 103e, 103f, and 103g do not include any digits like the digits illustrated and described in conjunction with FIG. 3, and are generally quadrilateral in shape, and in particular, are generally rectangular.

FIG. 4C illustrates a pattern created by overlaying drive electrode layer 40 comprising drive electrodes 102e, 102f, and 102g with sense electrode layer 45 comprising sense electrodes 103e, 103f, and 103g. Drive electrodes 102, as illustrated in FIG. 4A, run generally in one direction and are coupled to surface 101a of substrate 101 as described in conjunction with FIGS. 1, 2, and 3. Sense electrodes 103, as illustrated in FIG. 4B, run generally in an orthogonal direction to drive electrodes 102 and are coupled to surface 101b of substrate as described in conjunction with FIGS. 1, 2, and 3. Thus, although drive electrodes 102 and sense electrodes 103 do not make electrical contact, they are able to capacitatively couple to form capacitive nodes at the points where a drive electrode intersects or overlays a sense electrode. The dimensions of overlaying drive and sense electrodes may impact the area of a node. For example, overlaying drive electrode 102e on sense electrode 103e creates a capacitive node 140e at the point of intersection. Capacitive node 140e measures approximately width 151 by width 153. Overlaying drive electrode 102e on sense electrode 103f creates a capacitive node 140f at the point of intersection. Because the sense electrodes have approximately the same width, capacitive node 140f has approximately the same area as capacitive node 140e and also measures approximately width 153 by width 151. In particular embodiments, drive electrodes 102 and sense electrodes 103 may be configured to create any suitable number of nodes and nodes with any suitable area. In particular embodiments, drive electrode layer 40 may include any number of drive electrodes 102 suitable to the area of touch screen 10 and sense electrode layer 45 may include any number of sense electrodes 103 suitable to the area of touch screen 10.

Figure 5A:
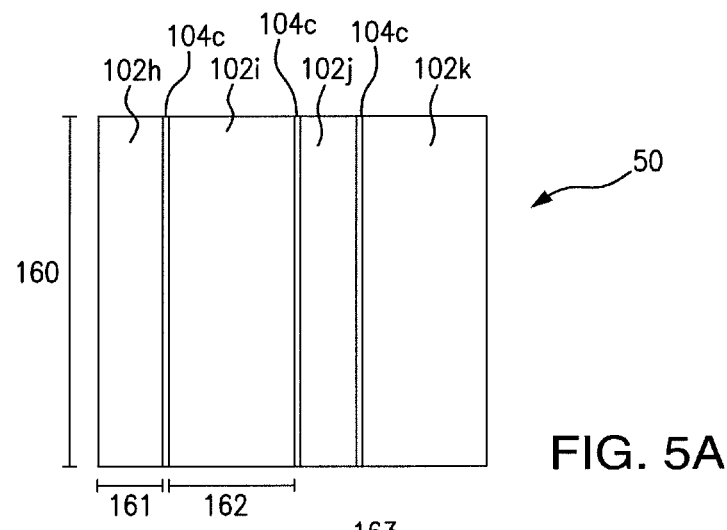
FIGS. 5A, 5B, and 5C illustrate another arrangement of sense and drive electrodes in accordance with particular embodiments of the disclosure.
Figure 5B:
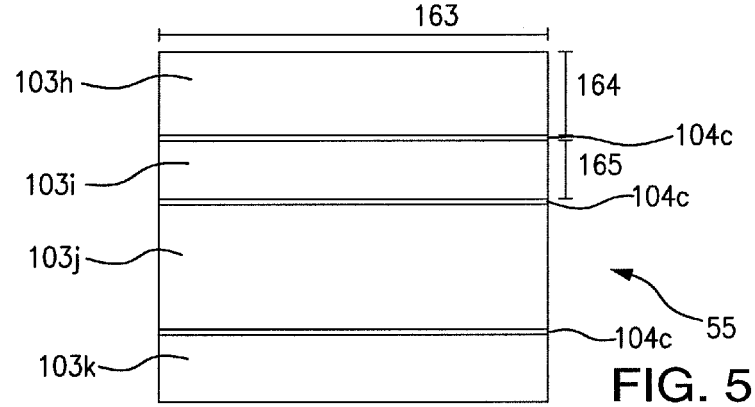
Figure 5C:
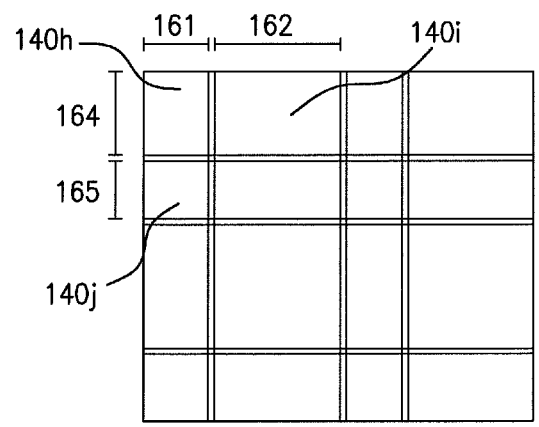

FIGS. 5A, 5B, and 5C illustrate another arrangement of drive electrodes 102 and sense electrodes 103 in accordance with particular embodiments of the disclosure. FIG. 5A illustrates a section of a drive electrode layer 50 with a particular pattern of drive electrodes 102 that could be used in touch sensor 10. Drive electrodes 102h, 102i, 102j, and 102k are formed from conductive mesh and are separated from each other by a plurality of gaps 104c. Gaps 104c are cuts in the lines of conductive mesh, which may be a cooper conductive mesh in particular embodiments, and may be as narrow as possible. For example, gaps 104c may have a width of approximately 100 µm to 5 µm, and in particular embodiments the width may be about 10 µm. Drive electrode 102h extends generally from one edge of the touch sensor to another, along a length 160. Drive electrode 102h has a width 161. Drive electrode 102i also extends generally from one edge of the touch sensor to another, along a length 160. Drive electrode 102i has a width 162, which is greater than width 161. In this embodiment, while drive electrodes 102h, 102i, 102j, and 102k each have approximately the same length, they have variable widths. In certain embodiments, drive electrodes 102h and 102j, and 102i and 102k may each have approximately the same width, respectively. In other embodiments, each electrode may have a unique width, while in particular embodiments, electrode width or widths may repeat with a regular or irregular pattern. The lengths and widths of the drive electrodes may depend on the size and shape of the touch sensor. Similarly to the drive electrodes described in conjunction with FIG. 4, drive electrodes 102h, 102i, 102j, and 102k are quadrilaterals and, contrary to conventional wisdom, do not utilize a digitized pattern, which may allow use in touch sensors with particular space and size constraints.

FIG. 5B illustrates a section of a sense electrode layer 55 with a particular pattern of drive electrodes 103 that could be used in touch sensor 10. Sense electrodes 103h, 103i, 103j, and 103k are formed from conductive mesh and are separated from each other by a plurality of gaps 104c. Gaps 104c are cuts in the lines of conductive mesh, which may be a copper conductive mesh in particular embodiments, and may be as narrow as possible. For example, gaps 104b may have a width of approximately 100 µm to 5 µm, and in particular embodiments the width may be about 10 µm. Sense electrode 103h extends generally from one edge of the touch sensor to another, along a length 163. Sense electrode 103h has a width 164. Sense electrode 103i also extends generally from one edge of the touch sensor to another, along a length 163. Sense electrode 103i has a width 165, which is greater than width 164. In this embodiment, while sense electrodes 103h, 103i, 103j, and 103k each have approximately the same length, they have variable widths. In certain embodiments, sense electrodes 103h and 103j, and 103i and 103k may each have approximately the same width, respectively. In other embodiments, each sense electrode 103 may have a unique width, while in particular embodiments, electrode width or widths may repeat with a regular or irregular pattern. In various embodiments, the widths of sense electrodes 103 may be approximately the same, greater, or less than the widths of drive electrodes 102. The lengths and widths of sense electrodes 103 may depend on the size and shape of touch sensor 10. Similarly to the sense electrodes described in conjunction with FIG. 4, sense electrodes 103h, 103i, 103j, and 103k are quadrilaterals and, contrary to conventional wisdom, do not utilize a digitized pattern, which may allow use in touch sensors with particular space and size constraints.

FIG. 5C illustrates a pattern created by overlaying drive electrode layer 50 comprising drive electrodes 102h, 102i, 102j, and 102k with sense electrode layer 55 comprising sense electrodes 103h, 103i, 103j, and 103k. Drive electrodes 102, as illustrated in FIG. 5A, run generally in one direction and are coupled to surface 101a of substrate 101 as described in conjunction with FIGS. 1 through 4. Sense electrodes 103, as illustrated in FIG. 5B, run generally in a direction orthogonal to drive electrodes 102 and are coupled to surface 101b of substrate 101 as described in conjunction with FIGS. 1 through 4. Thus, although drive electrodes 102 and sense electrodes 103 do not make electrical contact, they are able to capacitatively couple to form capacitive nodes at the points where a drive electrode intersects or overlays a sense electrode. The widths of overlaying drive and sense electrodes may impact the area of a node. For example, overlaying drive electrode 102h with sense electrode 103h creates a capacitive node 140h at the point of intersection. Capacitive node 140h measures approximately width 164 by width 161. Overlaying drive electrode 102h with sense electrode 103i creates a capacitive node 140j at the point of intersection. Capacitive node 140j measures approximately width 165 by width 161. Because sense electrode 103i has a width 165, which is less than width 164 of sense electrode 103h, capacitive node 140j has a smaller area than node 140h. Similarly, a capacitive node 140i is created by the intersection of drive electrode 102i and sense electrode 103h and measures width 164 by width 162. Because drive electrode has width 162, which is greater than width 161 of drive electrode 102h, capacitive node 140i has a larger area than node 140h. In particular embodiments, drive electrodes 102 and sense electrodes 103 may be configured to create any suitable number of nodes and nodes with any suitable area. For example, certain electrode configurations may result in nodes that each have equal areas and certain electrode configurations may result in nodes with one or more areas. As explained previously, the approach of utilizing digitized electrodes when creating generally orthogonal patterns may create challenges in touch sensors with certain characteristics, for example, in a touch sensor with a smaller node pitch such as 4 mm. Using a non-digitized electrode may avoid these challenges and may allow for improved performance in certain circumstances. For example, an electrode configuration that includes generally quadrilateral, or non-digitized, electrodes may allow for improved redundancy within the configuration. Electrode configurations that include generally quadrilateral electrodes may also be easier and/or more economically manufactured. In particular embodiments, drive electrode layer 50 may include any number of drive electrodes 102 suitable to the area of touch screen 10 and sense electrode layer 55 may include any number of sense electrodes 103 suitable to the area of touch screen 10.

Figure 6A:
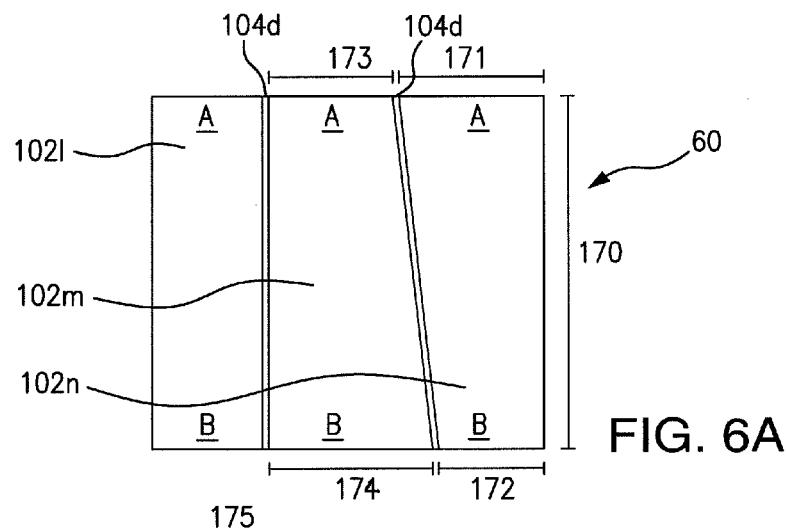
FIGS. 6A, 6B, and 6C illustrate another arrangement of sense and drive electrodes in accordance with particular embodiments of the disclosure.
Figure 6B:
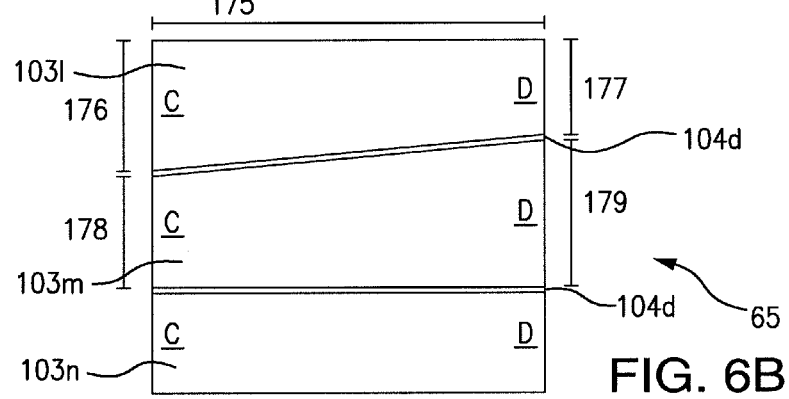
Figure 6C:
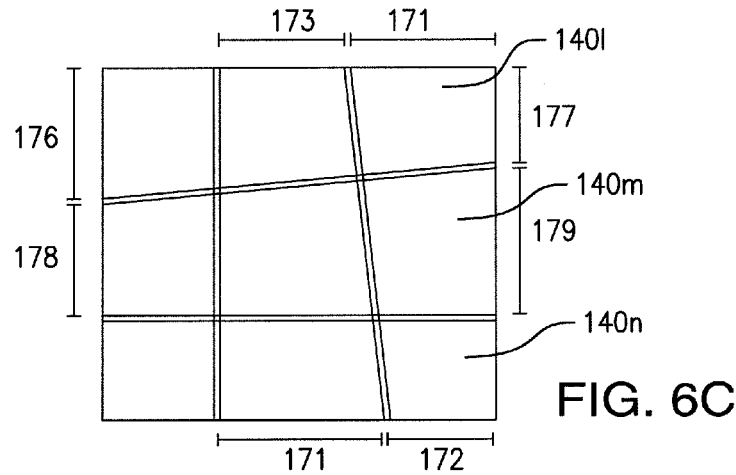

FIGS. 6A, 6B, and 6C illustrate another arrangement of drive electrodes 102 and sense electrode 103 in accordance with particular embodiments of the disclosure. FIG. 6A illustrates a section of a drive electrode layer 60 with a particular pattern of drive electrodes 102 that could be used in touch sensor 10. Drive electrodes 102l, 102m, and 102n are formed from conductive mesh and are separated from each other by a plurality of gaps 104d. Gaps 104d are cuts in the lines of conductive mesh, which may be a copper conductive mesh in particular embodiments, and may be as narrow as possible. For example, gaps 104d may have a width of approximately 100 μm to 5 μm, and in particular embodiments the width may be about 10 μm. Drive electrode 102n extends generally from one edge of the touch sensor to another, along a length 170. At a first end of the illustrated section, demarcated as end A, drive electrode 102n has a width 171. At a second end of the illustrated section, demarcated as end B, drive electrode 102n has a width 172. Width 171 is greater than width 172. The difference in widths at end A and end B causes drive electrode 120n to be generally shaped as a quadrilateral.

As explained in conjunction with FIG. 2, electrodes are often formed in a piece of conductive mesh by creating cuts, or channels, in the mesh. A cut effectively creates separate and adjacent electrodes. Gaps 104d run from end A to end B with a generally constant width. Therefore, the variation in width of electrode 102n may impact the dimensions of adjacent electrodes. As illustrated, electrode 102m has a width 173 at end A and a width 174 at end B. Width 173 is less than width 174. The differences in widths at end A and end B causes drive electrode 102m to be generally shaped as a quadrilateral. In various embodiments, some or all of the drive electrodes may have varying widths at a first end and a second end. In certain embodiments, the variation in width from a first end to a second end may repeat with a regular or irregular pattern. The length and widths of drive electrodes 102 may depend on the size and shape of touch sensor 10. Because drive electrodes 102l, 102m, and 102n may be formed in conductive mesh without the precise cuts required for a digitized pattern, these or similar electrodes may be used in touch sensors with particular space and/or size constraints.

FIG. 6B illustrates a section of a sense electrode layer 65 with a particular pattern of sense electrodes 103 that could be used in touch sensor 10. Sense electrodes 103l, 103m, and 103n are formed from conductive mesh and are separated from each other by a plurality of gaps 104d. Gaps 104d are cuts in the lines of conductive mesh, which may be a copper conductive mesh in particular embodiments, and may be as narrow as possible. For example, gaps 104d may have a width of approximately 100 μm to 5 μm, and in particular embodiments the width may be about 10 μm. Sense electrode 103n extends generally from one edge of the touch sensor to another, along a length 175. At a first end of the illustrated section, demarcated as end C, sense electrode 103n has a width 176. At a second end of the illustrated section, demarcated as end D, sense electrode 103n has a width 177. Width 176 is greater than width 177. The difference in widths at end C and end D causes sense electrode 103l to be generally shaped as a quadrilateral.

Gaps 104d run from end C to end D at a generally constant width. Therefore, the variation in width of electrode 103l may impact the dimensions of adjacent electrodes. As illustrated, drive electrode 103m has width 178 at end C and width 179 at end D. Width 178 is less than width 179. The differences in widths at end C and end D causes sense electrode 130m to be generally shaped as a quadrilateral. In various embodiments, some or all of sense electrodes 103 may have varying widths at a first end and at a second end. In certain embodiments, the variation in width from a first end to a second end may repeat with a regular or irregular pattern. The length and widths of the sense electrodes may depend on the size and shape of the touch sensor. Because sense electrodes 103l, 103m, and 103n may be formed in conductive mesh without the precise cuts required for a digitized pattern, these or similar electrodes may be used in touch sensors with particular space and/or size constraints.

FIG. 6C illustrates a pattern created by overlaying drive electrode layer 60 comprising drive electrodes 102l, 102m, and 102n with sense electrode layer 65 comprising sense electrodes 103l, 103m, and 103n. Drive electrodes 102, as illustrated in FIG. 6A, run generally in one direction and are coupled to surface 101a of substrate 101 as described in conjunction with FIGS. 1 through 5. Sense electrodes 103, as illustrated in FIG. 6B, run generally in a direction orthogonal to drive electrodes 102 and are coupled to surface 101b of substrate 101 as described in conjunction with FIGS. 1 through 5. Thus, although drive electrodes 102 and sense electrodes 103 do not make electrical contact, they are able to capacitatively couple to form capacitive nodes at the points where a drive electrode intersects or overlays a sense electrode. The widths of overlaying drive and sense electrodes may impact the area of a node. For example, overlaying drive electrode 102n with sense electrode 103l creates a capacitive node 140l at the point of intersection. Overlaying drive electrode 102n with sense electrode 103m creates a capacitive node 140m at the point of intersection. Similarly, overlaying drive electrode 102n with sense electrode 103n creates a capacitive node 140n at the point of intersection. Nodes 140l, 140m, and 140n are generally quadrilateral in shape, but do not share the same approximate area because the variation in widths 171 and 172 of drive electrode 102n, widths 173 and 174 of drive electrode 102m, widths 176 and 177 of sense electrode 103l, and widths 178 and 179 of sense electrode 103m impacts the area of the nodes. In particular embodiments, drive electrodes 102 and sense electrodes 103 may be configured to create any suitable number of nodes and nodes with any suitable area. For example, certain electrode configurations may result in nodes that each have equal areas and certain electrode configurations may result in nodes that with one or more areas. In particular embodiments, drive electrode layer 60 may include any number of drive electrodes 102 suitable to the area of touch screen 10 and sense electrode layer 65 may include any number of sense electrodes 103 suitable to the area of touch screen 10.

Technical advantages of particular embodiments may include the ability to use conductive mesh formed in a generally orthogonal pattern of quadrilaterally shaped drive electrodes and sense electrodes in a touch screen and may include a variety of improvements, such as an increase in redundancy within the electrode configuration, improved functionality in configurations with small node pitches, and/or improved overall functionality of the touch sensor. Additionally, forming quadrilaterally shaped drive and sense electrodes in a conductive mesh may not require the same cutting precision required for electrodes of particular shapes, for example electrodes comprising one or more digits. Thus, quadrilaterally shaped electrodes may be used in touch screens with space and/or shape requirements that might preclude other electrodes. Further, using quadrilaterally shaped electrodes may also result in reductions in manufacturing costs in certain embodiments. Using quadrilaterally shaped electrodes as described herein may provide improvements in production speed, may reduce production errors, and may include the ability to use other or lower-cost conductive mesh. Additional benefits may include other logistical and economic improvements.

Although this disclosure illustrates several configurations of touch sensor 10, these illustrations are not necessarily drawn to scale. Certain features have been exaggerated or enlarged for descriptive purposes. For example, in particular illustrations, the variation in widths of adjacent electrodes may have been increased or decreased for explanatory purposes.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch position-sensing panel comprising:
    a sensing area comprising:
        a substrate;
        a plurality of first electrodes in a first layer on a first side of the substrate, the plurality of first electrodes comprising conductive mesh and arranged in a first direction, the plurality of first electrodes each being a quadrilateral electrode having a first length and a first width, wherein each of the plurality of first electrodes spans the sensing area in the first direction;
        the first layer having a first plurality of gaps formed therein, each of the first plurality of gaps having a first length and a first width, the first width being greater than or equal to 5 micrometers and less than 20 micrometers, wherein each of the plurality of first electrodes are separated from at least one adjacent electrode of the plurality of first electrodes by one of the first plurality of gaps;
        a plurality of second electrodes in a second layer on a second side of the substrate, the plurality of second electrodes comprising conductive mesh and arranged in a second direction, the plurality of second electrodes each being a quadrilateral electrode having a second length and a second width, wherein each of the plurality of second electrodes spans the sensing area in the second direction;
        the second layer having a second plurality of gaps formed therein, each of the second plurality of gaps having a second length and a second width, the second width being greater than or equal to 5 micrometers and less than 20 micrometers, wherein each of the plurality of second electrodes are separated from at least one adjacent electrode of the plurality of second electrodes by one of the second plurality of gaps;
    wherein the plurality of first electrodes and the plurality of second electrodes overlap to create a plurality of nodes;
    wherein each of the first plurality of gaps and each of the second plurality of gaps runs in a generally straight line from one side of the sensing area to an opposing side of the sensing area;
    wherein the first length of each of the plurality of first electrodes is approximately equal to the second length of each of the plurality of second electrodes;
    wherein the first width of each of the plurality of first electrodes is approximately equal to the second width of each of the plurality of second electrodes;
    wherein the first length of each of the first plurality of gaps is approximately equal to the second length of each of the second plurality of gaps;
    wherein the first width of each of the first plurality of gaps is approximately equal to the second width of each of the second plurality of gaps,
    wherein the plurality of first electrodes are formed from a piece of conductive mesh by creating a plurality of cuts in the piece of conductive mesh, each of the plurality of cuts in the piece of conductive mesh being one of the plurality of gaps.

2. The touch position-sensing panel of claim 1, wherein the conductive mesh of one or more of the plurality of first electrodes and the conductive mesh of one or more of the plurality of second electrodes comprises copper.

3. The touch position-sensing panel of claim 1, wherein the conductive mesh of the plurality of first electrodes occupies an area of a shape of each of the plurality of first electrodes of equal to or less than approximately 5%.

4. The touch position-sensing panel of claim 1, wherein each of the plurality of first electrodes has approximately equal widths and approximately equal lengths.

5. The touch position-sensing panel of claim 1, wherein each of the plurality of second electrodes has approximately equal widths and approximately equal lengths.

6. The touch position-sensing panel of claim 1, wherein the first direction is perpendicular to the second direction.

7. A touch position-sensing panel comprising:
a sensing area comprising:
  a substrate;
  a plurality of first electrodes in a first layer on a first side of the substrate, the plurality of first electrodes comprising a conductive mesh and arranged in a first direction, each of the plurality of first electrodes spanning the sensing area in the first direction;
  the first layer having a first plurality of gaps formed in the mesh, at least one of the plurality of first electrodes separated from an adjacent electrode of the plurality of first electrodes by a gap of the first plurality of gaps, the gap of the first plurality of gaps separating the at least one electrode of the plurality of first electrodes and the adjacent electrode of the plurality of first electrodes from one side of the sensing area to an opposing side of the sensing area;
  a plurality of second electrodes in a second layer on a second side of the substrate, the plurality of second electrodes comprising a conductive mesh and arranged in a second direction, each of the plurality of second electrodes spanning the sensing area in the second direction;
  the second layer having a second plurality of gaps formed in the mesh, at least one of the plurality of second electrodes separated from an adjacent electrode of the plurality of second electrodes by a gap of the second plurality of gaps, the gap of the second plurality of gaps separating the at least one electrode of the plurality of second electrodes and the adjacent electrode of the plurality of second electrodes from one side of the sensing area to an opposing side of the sensing area;
wherein the plurality of first electrodes and the plurality of second electrodes overlap to create a plurality of nodes;
wherein each of the first plurality of gaps and each of the second plurality of gaps runs in a generally straight line from one side of the sensing area to an opposing side of the sensing area and has a width greater than or equal to 5 micrometers and less than 20 micrometers,
wherein the plurality of first electrodes are formed from a piece of conductive mesh by creating a plurality of cuts in the piece of conductive mesh, each of the plurality of cuts in the piece of conductive mesh being one of the first plurality of gaps.

8. The touch position-sensing panel of claim 7, wherein a width and a length of each of the plurality of first electrodes is approximately equal.

9. The touch position-sensing panel of claim 7, wherein a first width and a first length of each of gaps of the first plurality of gaps is approximately equal and a second width and a second length of each of the second plurality of gaps is approximately equal.

10. The touch position-sensing panel of claim 7, wherein a first width of a first electrode of the plurality of first electrodes is greater than a second width of a second electrode of the plurality of first electrodes.

11. The touch position-sensing panel of claim 7, wherein a first width of a first electrode of the plurality of first electrodes is greater at a first point along a length of the first electrode of the plurality of first electrodes than a second width at a second point along the length of the first electrode.

12. The touch position-sensing panel of claim 7, wherein a width of at least one electrode of the plurality of first electrodes is approximately equal to a width of at least one electrode of the plurality of second electrodes.

13. The touch position-sensing panel of claim 7, wherein a width of at least one electrode of the plurality of first electrodes is greater than a width of at least one electrode of the plurality of second electrodes.

14. The touch position-sensing panel of claim 7, wherein the first direction is perpendicular to the second direction.

15. The touch position-sensing panel of claim 7, wherein a length of at least one of the plurality of first electrodes is approximately equal to a length of at least one of the plurality of second electrodes.

* * * * *

UNITED STATES PATENT AND TRADEMARK OFFICE
CERTIFICATE OF CORRECTION

PATENT NO. : 9,086,770 B2  
APPLICATION NO. : 13/863036  
DATED : July 21, 2015  
INVENTOR(S) : Esat Yilmaz Page 1 of 1

It is certified that error appears in the above-identified patent and that said Letters Patent is hereby corrected as shown below:

In the claims:

Column 16, Line 19, Claim 9: After "first length of each" and before "of the first plurality" delete "of gaps".

Signed and Sealed this  
Twenty-ninth Day of March, 2016

Michelle K. Lee  
*Director of the United States Patent and Trademark Office*